United States Patent [19]

Matsuzaki et al.

[11] Patent Number: 5,685,064
[45] Date of Patent: Nov. 11, 1997

[54] PROCESS OF MANUFACTURING A MAGNETIC HEAD SLIDER ASSEMBLY

[75] Inventors: Mikio Matsuzaki, Saitama; Atsushi Iijima, Nagano, both of Japan

[73] Assignee: TDK Corporation, Tokyo, Japan

[21] Appl. No.: 416,323

[22] Filed: Apr. 4, 1995

Related U.S. Application Data

[62] Division of Ser. No. 228,854, Apr. 18, 1994, abandoned.

[30] Foreign Application Priority Data

Apr. 22, 1993 [JP] Japan ................... 5-117594
Mar. 18, 1994 [JP] Japan ................... 6-072889

[51] Int. Cl.$^6$ ................... G11B 5/42
[52] U.S. Cl. ................... 29/603.12; 360/103
[58] Field of Search ................... 29/603.12; 360/103, 360/122

[56] References Cited

U.S. PATENT DOCUMENTS

| | | | |
|---|---|---|---|
| 4,226,018 | 10/1980 | Nakanishi et al. | 29/603.12 |
| 4,251,841 | 2/1981 | Jacobs | 360/103 X |
| 4,673,996 | 6/1987 | White | 360/103 |
| 4,870,519 | 9/1989 | White | 360/103 |
| 5,060,098 | 10/1991 | Gotah et al. | 360/103 |
| 5,347,412 | 9/1994 | Nitta et al. | 360/103 |
| 5,520,716 | 5/1996 | Takagi et al. | |

FOREIGN PATENT DOCUMENTS 4-321555 of 1992 Japan.
4-321556 of 1992 Japan.
4-321557 of 1992 Japan.

*Primary Examiner*—Carl E. Hall
*Attorney, Agent, or Firm*—Nikaido, Marmelstein, Murray & Oram LLP

[57] ABSTRACT

A slider assembly for a flying magnetic head is made of a ceramic material including a plurality of components having different milling rates from each other. A grain size of one of the components having a lower milling rate is smaller than a grain size of another one of the components having a higher milling rate.

5 Claims, 4 Drawing Sheets

PROCESS OF MANUFACTURING A MAGNETIC HEAD SLIDER ASSEMBLY

This is a division of application Ser. No. 08/228,854 filed Apr. 18, 1994, now abandoned.

BACKGROUND OF THE INVENTION

1. Field of the Invention

The present invention relates to a slider assembly for a flying magnetic head and to a process of manufacturing the slider assembly.

2. Description of the Related Art

A typical magnetic head slider assembly has at least one magnetic read/write transducer at its rear end and produces a flying force to float itself above a rotating magnetic disk surface moving at high speed by means of pressurization of air flowing between Its air bearing surface (ABS) and the magnetic disk surface.

A flying height of the slider assembly will be tried to adjust to an appropriate value by balancing a spring force applied to the slider assembly with the flying force. However, in case that such the slider assembly is mounted to one end of a support arm which is driven to swing around its fulcrum positioned at the other end; the flying height will be varied depending upon a radius position of the slider on the rotating disk. This variation in the flying height is caused by angular skew of the slider and by difference of an access velocity of the slider against the rotating disk.

FIG. 1 shows a measured characteristics of such the flying height variation, in which the axis of abscissas indicates an access velocity and a skew angle of the slider assembly and the axis of ordinate indicates a flying height of the slider assembly. In the figure, a reference numeral 10 denotes a flying height variation characteristics in accordance with the access velocity difference, 11 a flying height variation characteristics in accordance with the skew angle, and 12 a practical flying height variation characteristics corresponding to a composite characteristics of the flying height variations 10 and 11.

A slider head assembly having at least one air bearing surface provided with a specific transverse pressurization contour (TPC) along each side edge of the air bearing surface so that its flying height essentially insensitive to skew angle and to access velocity is described in U.S. Pat. Nos. 4,673,996 and 4,870,519.

FIG. 2 shows a transversal cross sectional view of one rail of the slider head assembly described in the above-mentioned patents. In the figure, a reference numeral 20 denotes a rail extending rearwardly from a front edge of a slider assembly 21 and being projected from one surface of the slider 21 to form an air bearing surface 20a, and 22 and 23 denote notched recesses (TPC) formed along both side edges of the air bearing surface 20a of the rail 20, respectively. One of these notched recesses 22 and 23 serves for pressurization and the other serves for expansion of the rail 20 so as to compensate the above-mentioned change of the flying height due to slider skew angle and/or access velocity. In order to perform this TPC function, the notched recesses 22 and 23 should have a very small depth of about 0.6 to 1.2 μm and a surface roughness of the recesses 22 and 23 have to keep within ±0.15 μm.

If such the notched recesses for compensating a flying height change are milled by an ion milling method, the surface of the recesses may be formed extremely rough so that a depth of a part of the recesses may differ from that of the remaining part. Especially, when the ion beam is applied to the surface at an angle near the perpendicular, the above-mentioned tendency of roughness will be extremely increased. FIGS. 3a and 3b show measured depths of the notched recesses 22 and 23 milled by means of an ion beam applied to the surface at an angle of near the perpendicular according to the conventional technique, respectively.

If the surface of the recesses is formed rough and therefore the surface roughness is not kept within a effective range between ±0.15 μm, a turbulent air flow will occur at these surfaces to produce a negative force. Thus, a transversal pressurization function caused by these notched recesses will not be obtained.

In case that an incident angle of the ion beam is inclined from zero degree (perpendicular with respect to the air bearing surface), the notched recesses will be formed with a small surface roughness but its stepping side wall will be milled in a tapered shape. If the stepping side wall is formed in tapered, an effective transversal pressurization force cannot be expected.

SUMMARY OF THE INVENTION

It is therefore an object of the present invention to provide a magnetic head slider assembly having at least one air bearing surface which has a recess with a stepping side wall formed in a desired shape and with a smooth surface.

Another object of the present invention is to provide a process of manufacturing the slider assembly having at least one air bearing surface which has a recess with a stepping side wall formed in a desired shape and with a smooth surface, by using an ion milling method.

According to the present invention, a magnetic head slider assembly is made of a ceramic material including a plurality of components having different milling rates from each other. A grain size of one of the components having a lower milling rate is smaller than a grain size of another one of the components having a higher milling rate. In other words, according to the present invention, a slider assembly is made of a ceramic material consisting of at least two components having at least first and second milling rates. The first milling rate is lower than the second milling rate, and a grain size of one of the components having the first milling rate is selected smaller than a grain size of another one of the components having the second milling rate.

Most of the magnetic head slider assemblies are in general made of a ceramic material consisting of two or more components. Since these components have different milling rates from each other, if the ceramic blocks having these composition are milled by an ion milling method, milled surfaces will be formed extremely rough as shown in FIGS. 3a and 3b, because a higher milling rate component will be milled faster. However, according to the present invention, since a grain size of the lower milling rate component Is smaller than a grain size of the higher milling rate component, both the milling rates of these components become substantially the same with each other. As a result, a smoothly milled surface can be obtained even if an ion beam at a nearly right angle to the surface is used. Furthermore, a smooth surface can be expected by one milling process.

According to the present invention, furthermore, a process of manufacturing a slider assembly has a step of preparing a ceramic material block consisting of at least two components having at least first and second milling rates, the first milling rate being lower than the second milling rate, a grain size of one of the components having the first milling rate being smaller than a grain size of another one of the components having the second milling rate, a step of forming a plurality of thin film transducers for a plurality of the slider assemblies, on an upper surface of the ceramic material block, a step of forming a plurality of air bearing surfaces for the plurality of the slider assemblies on a side surface of the ceramic material block, a step of forming a pair of notched recesses along both edges of each the air bearing surface of the ceramic material block by an ion milling, and a step of cutting the ceramic material block into each slider assembly. In this case, also since a grain size of the lower milling rate component is smaller than a grain size of the higher milling rate component, both the milling rates of these components become substantially the same with each other resulting that a smoothly milled surface can be obtained even if an ion beam at a nearly right angle to the surface is used.

The notched recesses forming step preferably Includes a step of forming the notched recesses by means of an ion beam with an incident angle of 0 to 20 degrees with respect to the air bearing surface.

It is preferred that the ceramic material block has a composition of $Al_2O_3$—TiC.

A ratio of the grain sizes of the components of TiC and $Al_2O_3$ may be 1.0:1.3 to 3.0.

It is also preferred that the ceramic material block has a composition selected from a group of $Al_2O_3$—TiC—$TiO_2$, $Al_2O_3$—$ZrO_2$ and $Al_2O_3$—SiC.

Further objects and advantages of the present invention will be apparent from the following description of the preferred embodiments of the invention as Illustrated in the accompanying drawings.

DESCRIPTION OF THE PREFERRED EMBODIMENTS

Figure 4:
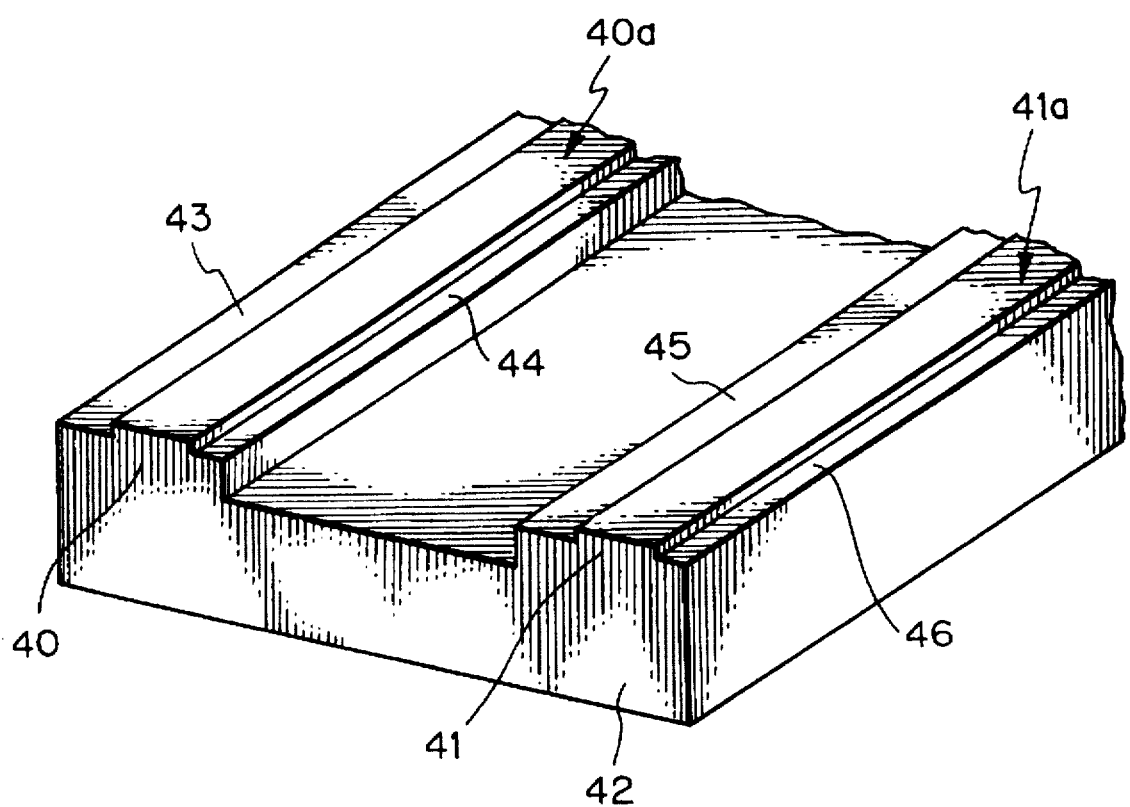
FIG. 4 shows an oblique view of a part of a magnetic head slider assembly in a preferred embodiment according to the present invention.

FIG. 4 is an oblique view schematically illustrating a partial structure of a rear side part of a magnetic head slider assembly in a preferred embodiment according to the present invention.

In the figure, reference numerals 40 and 41 denote a pair of rails extending rearwardly from a front edge of a slider assembly 40 and being projected from one surface of the slider 40 to form air bearing surfaces 40a and 41a, respectively. Notched recesses (TPC) 43 and 44 and notched recesses (TPC) 45 and 48 are formed along both side edges of the respective air bearing surfaces 40a and 41a of the rails 40 and 41. The wider notched recesses 43 and 45 are formed at inner side edges of the air bearing surfaces 40a and 41a corresponding to an inside radius of a rotating magnetic disk, and the narrower notched recesses 44 and 46 are formed at outer side edges of the air bearing surfaces 40a and 41a corresponding to an outside radius of the rotating magnetic disk. The notched recesses 43 and 45 serve for pressurization and the other notched recesses 44 and 46 serve for expansion of the rails 40 and 41, so as to produce a transversal pressurization force for the slider assembly 42 resulting a change of the flying height due to slider skew angle and/or access velocity to compensate. In order to perform this TPC function, the notched recesses 43 to 46 have a very small depth of about 0.6 to 1.2 µm.

The slider assembly 42 is made of a ceramic material having a composition of $Al_2O_3$ (up to 70 weight %) and TiC (up to 30 weight %). In general, if the size of particles of TiC is substantially the same as that of $Al_2O_3$, a ratio of milling rates of TiC and $Al_2O_3$ by means of an ion beam applied to the surface at an angle of the perpendicular will be about 1.0:1.5. In this embodiment, a grain size of TiC is selected to one smaller than that of $Al_2O_3$ so as to increase the milling rate of TiC. As a result, the milling rates of both TiC and $Al_2O_3$ becomes the same with each other. In practice, a ratio of the grain sizes of TiC and $Al_2O_3$ will be determined to 1.0:1.3 to 3.0. Because of a crystal face effect which may be equivalent to that occurring with the increased incident angle of an ion beam, a milling rate increases with a smaller grain size without practically changing the incident angle.

A manufacturing process of a slider assembly 42 having such the notched recesses 43 to 46 will be now described.

First, a ceramic wafer (substrate) having a composition of $Al_2O_3$—TiC in which a ratio of grain sizes of TiC and $Al_2O_3$ is 1.0:1.3 to 3.0 is prepared. A thickness of the ceramic wafer will be substantially equal to a slider surface length. Then, a plurality of magnetic head transducers arranged in a matrix are formed on this ceramic wafer by means of a thin film technology. The ceramic substrate is then cut into a plurality of rectangular bars each of which has a plurality of the thin film transducers aligned in one row along the bar. Thereafter, for each slider block, a pair of rails 40 and 41 are manufactured by forming a recess between the rails 40 and 41 by means of mechanical processing such as grinding and lapping, or by chemical or physical processing such as chemical etching, plasma etching or ion milling.

After forming the rails, surfaces of these rails are polished to form air bearing surfaces. Then, the aforementioned notched recesses (43 to 46) are formed along both side edges of the respective air bearing surfaces of the rails by an ion milling process. This ion milling process has following steps. (1) The slider surface (air bearing surfaces) is spin-coated with a photo resist material to make a photo resist layer. (2) A part of the coated photo resist layer is removed to make an ion beam mask. The removed part corresponds to a pattern of the notched recesses to be formed. (3) The air bearing surfaces coated with the ion beam mask of the photo resist layer are ion-milled by a substantially perpendicular beam having an Incident angle of about 0 to 20 degrees. The milled depth of the air bearing surfaces, namely of notched recesses is about 0.6 to 1.2 µm in this case. (4) The photo resist mask is then removed. Thereafter, the bars are cut into each slider assembly.

In stead of using such the photo resist mask, a mask using a thick dry film resist layer laminated on the slider surface can be used as described in U.S. Pat. No. 4,564,585. A two layers mask composed of a metal mask and a photo resist mask laminated each other can be also used.

Figure 1:
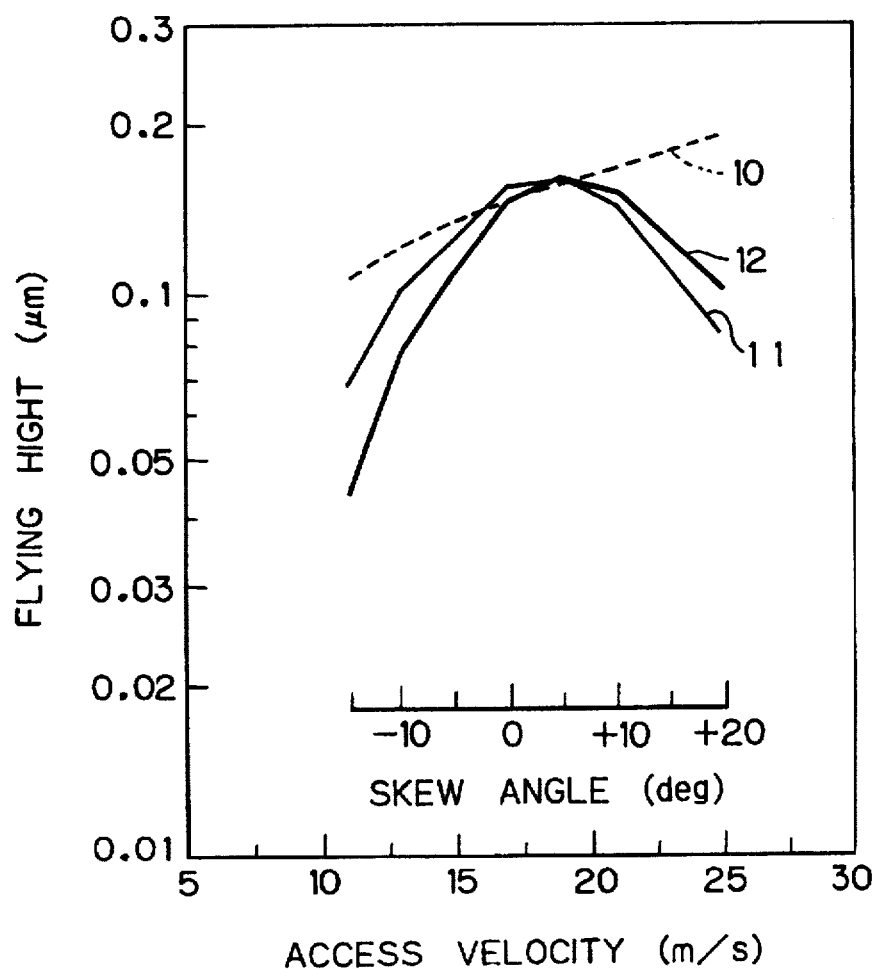
FIG. 1 shows a measured characteristics of flying height variations of a typical magnetic head slider assembly according to a conventional art.
Figure 2:
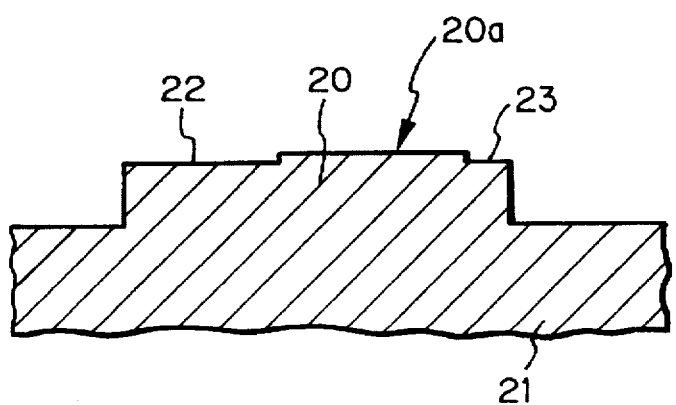
FIG. 2 shows a transversal cross sectional view of one rail of a typical magnetic head slider assembly according to a conventional art.
Figure 3A:
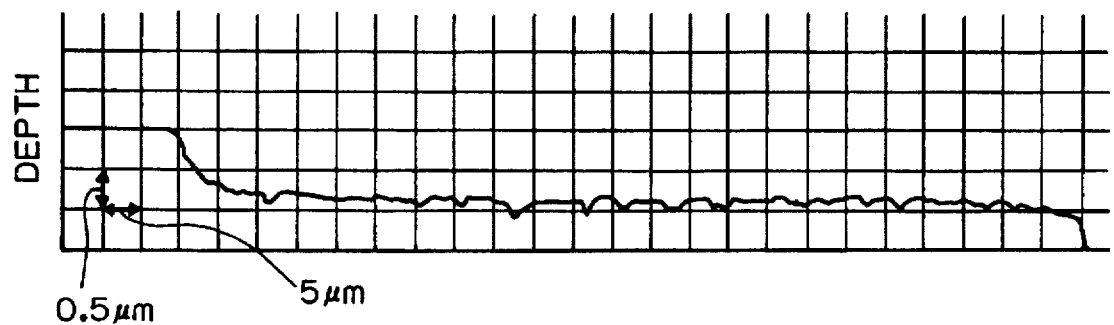
FIGS. 3a and 3b show measured depths of notched recesses of the typical magnetic head slider assembly according to a conventional art.
Figure 3B:
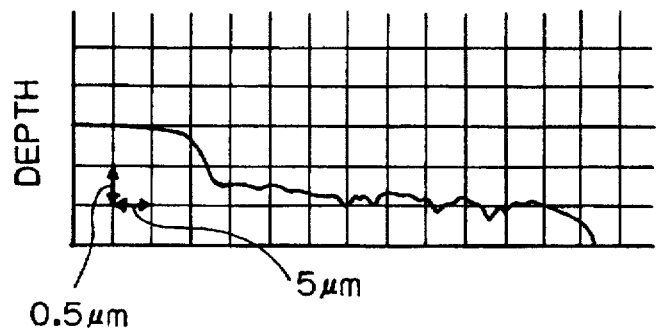
Figure 5A:
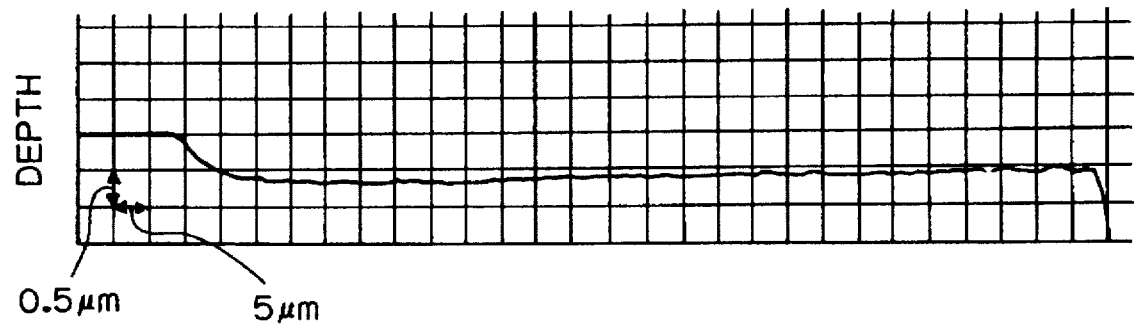
FIGS. 5a and 5b show measured depths of notched recesses of the magnetic head slider assembly of the embodiment shown in FIG. 4.
Figure 5B:
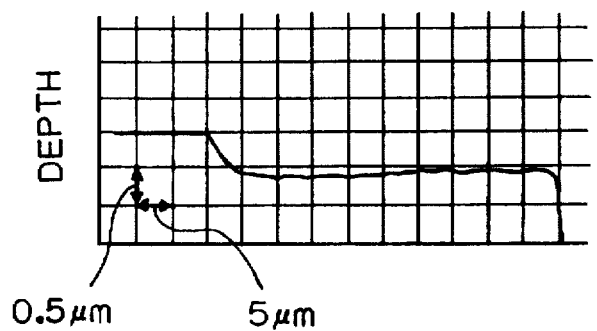

FIGS. 5a and 5b show measured depths of the notched recesses 43 (45) and 44 (46) milled by means of an ion beam applied to the air bearing surface at an angle of near the perpendicular according to the above-mentioned embodiment, respectively. As will be apparent from a comparison of FIGS. 5a and 5b with FIGS. 3a and 3b, the surfaces of the notched recesses of this embodiment has less irregularity and is far smoother than that made by the conventional technique. Thus, notched recesses with a very accurate depth can be obtained and therefore unnecessary negative force will not be produced resulting highly effective transversal pressurization function can be expected. Furthermore, since the milling is completed by one process using only a nearly perpendicular beam to the air bearing surfaces, the notched recesses can be formed with perpendicular, not tapered, stepping side walls resulting an effective transversal pressurization force to be ensured. Therefore, a flying height change due to slider skew angle and/or access velocity can be effectively compensated so that the same flying height can be maintained from an inside track to an outside track of the rotating magnetic disk. As a result, the slider assembly according to this embodiment can be utilized in a magnetic read/write head for a high density recording using a zone-bit method.

For a ceramic substrate, various material with different compositions can be used other than $Al_2O_3$—TiC. For example, $Al_2O_3$—TiC—$TiO_2$, $Al_2O_3$—$ZrO_2$ or $Al_2O_3$—SiC may be used. In case of utilizing these materials, a grain size of the component having a lower milling rate is necessary to be selected to one smaller than that of the component having a higher milling rate so that the milling rates of both the components are substantially equal to each other.

In the aforementioned embodiment, the present invention is applied to a slider assembly having ion milled TPC notched recesses for compensating a flying height variation. However, it is apparent that the present invention can be applied to a negative pressure slider assembly, described in U.S. Pat. No. 4,564,585, having an ion milled recess for producing a negative pressure to provide a very narrow clearance between the slider and a rotating disk.

Many widely different embodiments of the present invention may be constructed without departing from the spirit and scope of the present invention. It should be understood that the present invention is not limited to the specific embodiments described in the specification, except as defined in the appended claims.

What is claimed is:

1. A process of manufacturing a slider assembly comprising the steps of:

preparing a ceramic material block consisting of grains of at least first and second ion beam millable Ceramic components having at least first and second inherent ion beam milling rates, respectively, wherein said first inherent ion beam milling rate is lower than said second inherent ion beam milling rate, and wherein a grain size of the first of said components is smaller than a grain size of the second of said components in proportion to the inherent ion beam milling rates of said first and second components;

forming a plurality of thin film transducers, for a plurality of the slider assemblies, on an upper surface of said ceramic material block;

forming a plurality of air bearing surfaces for the plurality of the slider assemblies on a side surface of said ceramic material block, wherein each air bearing surface of said plurality of air bearing surfaces has two edges;

ion beam milling notched recesses along both edges of said each air bearing surface of said ceramic material block, wherein, because of the combination of the inherent ion beam milling rates and the grain sizes of said first and second components, the overall rate of ion beam milling is substantially the same for said first and said second components; and cutting said ceramic material block into each slider assembly of said plurality of slider assemblies.

2. A process as claimed in claim 1, wherein at least one of said first or said second components of said ceramic material block has a composition of $Al_2O_3$—TiC.

3. A process as claimed in claim 2, wherein each of said first and said second components has a different ratio of TiC to $Al_2O_3$, and wherein a ratio of the grain sizes of said first to said second components is 1.0:1.3 to 3.0.

4. A process as claimed in claim 1, wherein at least one of said first and second components of said ceramic material block has a composition selected from the group consisting of $Al_2O_3$—TiC—$TiO_2$, $Al_2O_3$—$ZrO_2$, and $Al_2O_3$—SiC.

5. A process as claimed in claim 1, further comprising forming said notched recesses by directing said ion milling beam at an incident angle of 0 to 20 degrees with respect to the air bearing surface.

* * * * *